(12) United States Patent
Capuzzi

(10) Patent No.: US 9,902,844 B2
(45) Date of Patent: Feb. 27, 2018

(54) POLYPHASE BIODEGRADABLE COMPOSITIONS CONTAINING AT LEAST ONE POLYMER OF VEGETABLE ORIGIN

(75) Inventor: Luigi Capuzzi, Novara (IT)

(73) Assignee: NOVAMONT S.P.A., Novara (IT)

( * ) Notice: Subject to any disclaimer, the term of this patent is extended or adjusted under 35 U.S.C. 154(b) by 25 days.

(21) Appl. No.: 13/814,420

(22) PCT Filed: Aug. 5, 2011

(86) PCT No.: PCT/EP2011/063575
§ 371 (c)(1),
(2), (4) Date: Feb. 5, 2013

(87) PCT Pub. No.: WO2012/017095
PCT Pub. Date: Feb. 9, 2012

(65) Prior Publication Data
US 2013/0136879 A1 May 30, 2013

(30) Foreign Application Priority Data

Aug. 6, 2010 (IT) .............................. MI2010A1525

(51) Int. Cl.
| | | |
|---|---|---|
| *C08L 3/02* | (2006.01) | |
| *B65D 65/46* | (2006.01) | |
| *C08J 5/18* | (2006.01) | |
| *C08L 67/00* | (2006.01) | |
| *C08L 67/03* | (2006.01) | |
| *C08K 5/06* | (2006.01) | |
| *C08L 67/04* | (2006.01) | |

(52) U.S. Cl.
CPC .............. *C08L 3/02* (2013.01); *B65D 65/466* (2013.01); *C08J 5/18* (2013.01); *C08K 5/06* (2013.01); *C08L 67/00* (2013.01); *C08L 67/03* (2013.01); *C08J 2367/02* (2013.01); *C08J 2403/02* (2013.01); *C08K 2201/014* (2013.01); *C08L 67/04* (2013.01); *C08L 2201/06* (2013.01); *Y02W 90/13* (2015.05); *Y10T 428/1334* (2015.01); *Y10T 428/1338* (2015.01)

(58) Field of Classification Search
CPC .......... C08L 67/00; C08L 67/02; C08L 67/03; C07C 43/11; C07C 43/03; C07C 43/135; C08G 65/34; C08J 5/18; C08J 2367/02; C08J 2403/02; C08J 2403/04; C08J 2403/08; C08J 2403/06; C08J 2403/10

USPC ................. 524/17, 27, 28, 34, 47, 270, 605; 428/35.1, 35.2, 35.5, 35.7, 36.4, 220, 221, 428/302, 481, 480; 525/418, 450

See application file for complete search history.

(56) References Cited

U.S. PATENT DOCUMENTS

| | | | |
|---|---|---|---|
| 3,968,169 A * | 7/1976 | Seiden et al. ................. | 568/680 |
| 8,043,679 B2 | 10/2011 | Bastioli et al. | |
| 2007/0049775 A1* | 3/2007 | Endo et al. .................... | 568/675 |
| 2008/0188593 A1* | 8/2008 | Bastioli .................. | C08G 63/16 524/35 |

FOREIGN PATENT DOCUMENTS

| | | |
|---|---|---|
| CN | 1066859 A | 12/1992 |
| CN | 101516997 A | 8/2009 |
| EP | 1621579 A1 | 2/2006 |
| WO | WO-92/14782 A1 | 9/1992 |
| WO | WO-1992/014782 A1 | 9/1992 |
| WO | WO 2008037744 A2 * | 4/2008 |
| WO | WO 2009135921 A1 * | 11/2009 |

OTHER PUBLICATIONS

Solvay Chemicals International "Polyglycerols—General Overview: Product Data Sheet", Sep. 2008 available at http://www.solvaychemicals.com/Chemicals%20Literature%20Documents/Polyglycerols/DOC_2800_general_overview_x3.pdf.*

Solvay Chemicals: "Polyglycerols in Industrial Applications", Internet Citation, Apr. 1, 2005, pp. 1-11, XP002631093, Retrieved from the Internet: URL:http://www.solvaychemicals.us/static/wma/pdf/1/4/0/9/7/PGL_IndustrialApplication.pdf (p. 7-10).

Solvay Chemicals: "Polyglycerols—General overview", Internet Citation, Nov. 1, 2009, pp. 1-10, XP002631092, Retrieved from the Internet: URL:http://www.solvaychemicals.us/static/wma/pdf/1/6/9/5/8/PGL_overview.pdf (the whole document).

* cited by examiner

*Primary Examiner* — Lee E Sanderson
(74) *Attorney, Agent, or Firm* — Polsinelli PC

(57) ABSTRACT

Polyphase biodegradable compositions having a good resistance to ageing comprising a continuous phase comprising at least one hydrophobic polyester and at least one dispersed phase of polymer of vegetable origin. The hydrophobic polyester constituting the continuous phase is incompatible with the polymer of vegetable origin. The compositions comprise a plasticizer comprising at least 75% of a mixture of diglycerol, triglycerol and tetraglycerol.

8 Claims, No Drawings

POLYPHASE BIODEGRADABLE COMPOSITIONS CONTAINING AT LEAST ONE POLYMER OF VEGETABLE ORIGIN

CROSS REFERENCE TO RELATED APPLICATIONS

This application is a National Phase filing under 35 U.S.C. § 371 of PCT/EP2011/063575 filed on Aug. 5, 2011; and this application claims priority to Application No. MI2010A001525 filed in Italy on Aug. 6, 2010; the entire contents of all are hereby incorporated by reference.

This invention relates to polyphase biodegradable compositions containing at least one polymer of vegetable origin, such as for example starch, which are capable of being converted into high strength flexible films isotropic in both the longitudinal and transverse directions, in particular as regards resistance to tearing, in which the vegetable polymers are plasticised by mixtures of plasticisers comprising diglycerol, triglycerol and tetraglycerol.

Said films have proved to be particularly suitable for the production of bags and wrappings capable of supporting great weights without great deformation and without showing transverse fractures.

In particular, this invention relates to polyphase biodegradable compositions having a good resistance to ageing comprising:
(a) a continuous phase comprising at least one hydrophobic polyester,
(b) at least one dispersed phase comprising at least one polymer of vegetable origin, in which the hydrophobic polyester of the continuous phase is incompatible with the polymer of vegetable origin, said compositions being characterised by the fact of comprising 2-70% by weight, with respect to the weight of the polymer of vegetable origin, of a plasticizer comprising at least 75% by weight, with respect to the total weight of said plasticizer, of a mixture of diglycerol, triglycerol and tetraglycerol.

When transformed into films of thickness between 20 and 30 μm said compositions show an Elmendorf tear strength of more than 100 N/m in the longitudinal direction and more than 60 N/mm in the transverse direction, measured according to the standard ASTM D1922 at 23° C., 55° RH (relative humidity). Furthermore such films show an unexpected behaviour in terms of migrations of plasticizer.

Even if highly soluble in water like glycerol, the plasticizers according to the present invention show a much lower tendency to migrate when the biodegradable polyphasic composition according to the invention are submitted to migration tests with water. Such result indicates that said films are particularly suitable for the production of bags and wrappings for food packaging applications, One drawback of biodegradable bags produced from polyphase biodegradable compositions containing dispersed phases of starch currently available on the market arises from the lack of uniformity in their mechanical properties, in particular their tear resistance in the transverse and longitudinal directions. The 60×60 cm shopping bags (shoppers) available in major retail outlets are predominantly produced of PE in thicknesses of around 18-20 μm. For example, at these thicknesses biodegradable films based on starch plasticised with plasticisers other than water, such as glycerine, are still generally very anisotropic in terms of tear strength. The manufacture of these films also gives rise to problems arising from the build-up of plasticiser on the film-producing heads during the bubble extrusion stage, which if not removed at regular intervals gives rise to the development of fumes and oily condensates. Furthermore said plasticizer migrate when in contact with food or food simulants like water.

Additionally, films comprising starch which has been destructurized and rendered thermoplastic with water are more isotropic, but have reduced productivity in the stages of both compounding and film-forming, and give rise to greater process irregularities.

There is therefore the problem of finding new polyphasic biodegradable compositions containing dispersed phases of polymers of vegetable origin which are capable of providing good workability properties together with high mechanical properties, and in particular isotropy in the transverse and longitudinal directions as regards tear strength.

Starting from the technical problem set out above, it has now been surprisingly discovered that thanks to the use of particular mixtures of diglycerol, triglycerol and tetraglycerol it is possible to obtain new biodegradable polyphase compositions comprising at least one dispersed phase comprising at least one polymer of vegetable origin which can be converted in films with a productivity equal to that of compositions containing glycerine but without the production of fumes and oily condensates on the film-forming heads and which are at the same time characterized by high mechanical properties, and in particular isotropy in the transverse and longitudinal directions with regard to tear strength.

The biodegradable compositions according to the present invention in fact make it possible to produce bags having thicknesses of the order of 18-20 μm, that is to say of thicknesses comparable with those of medium density polyethlyene. It is also possible to produce loop-handles having dimensions of approximately 70×70 cm and thicknesses of less than 40 μm, that is smaller than the thicknesses of loop-handle LDPE bags, which are now of the order of 50 μm.

Furthermore, when submitted to migration tests with water said new biodegradable polyphase compositions according to the invention show lower losses of plasticizer with respect to composition based on starch plasticised with glycerine.

Particularly, when contacted with water at 20° C. for 24 hours, less than 50%, preferably less than 30% by weight of said plasticizer migrates from the biodegradable composition according to the present invention.

The compositions according to the present invention are biodegradable according to standard EN 13432.

In particular, the biodegradable composition according to this invention comprise:
(a) as regards the continuous phase, at least one hydrophobic polyester in a percentage of between 98 and 45%, preferably between 95 and 55% by weight, and more preferably between 90 and 65% by weight with respect to the sum of components (a) and (b),
(b) as regards the dispersed phase, at least one polymer of vegetable origin in a percentage between 2 and 55%, preferably between 5 and 45%, and more preferably between 10 and 35% by weight with respect to the sum of components (a) and (b).

In a preferred embodiment said compositions comprise a further dispersed phase comprising at least one polymer which is rigid in comparison with the hydrophobic polyester forming the continuous phase, with a Young Modulus of more than at least 300%, more preferably more than 500% and even more preferably more than 700% with respect to the said hydrophobic polyester, said rigid polymer being comprised in a percentage preferably between 1 and 40%, more preferably between 2 and 30%, and even more preferably between 5 and 25% by weight with respect to the total weight of the composition.

In order to obtain the polyphasic material according to the present invention having rigidity and toughness in the two transverse and longitudinal directions greater than those of the materials containing polymers of vegetable origin plasticized with glycerine hitherto described in the prior art, it is necessary to apply a process in an extruder or any other machine capable of ensuring temperature and shear (shear deformation) conditions allowing the formation of the dispersed phase of the vegetable origin polymer. Another surprising element of this invention is that it is possible to obtain high strength flexible films isotropic in both the longitudinal and transverse directions, in particular as regards resistance to tearing, even with a dispersed phase of polymer of vegetable origin with mean dimension greater than 1 micron.

The dimensions of the vegetable origin polymer particles are measured in the transverse section with respect to the direction of the extrusion flow or, anyhow, with respect to the direction of material's output.

For this purpose a sample of the biodegradable composition which is to be examined is immersed in liquid nitrogen and subsequently fractured so as to obtain a fracture surface along a cross-section of the sample. The portion of the sample which is to be examined is then subjected to selective etching, dried and a thin layer of metal is deposited thereupon, for example a mixture of gold/palladium, using a "sputter coater". Finally, the surface of the fracture is examined under a scanning electron microscope (SEM).

The dimension of the particles is determined measuring the dimensions of the holes on the surface of fracture after the selective etching.

The mean dimension of the partile, i.e. the holes detectable on the etched surface of the fracture, is calculated as the numeral (or arithmetic) average of the particles dimensions.

In case of a spherical particle the dimension of the particle corresponds to the diameter of a circle corresponding to the bidimensional shape resulting from the transverse section. In case of non-spherical particle the dimension (d) of the particle is calculated according to the following formula $$d=\sqrt{d_1 \cdot d_2}$$

Where $d_1$ is the minor diameter and $d_2$ is the major diameter of the ellipse in which the particle can be inscribed or approximated.

In case of a dispersed phase of starch, the selective etching may be advantageously performed with HCl 5 N as etchant with an etching time of 20 minutes at an etching temperature of 25° C.

Another special feature is the lesser tendency of this dispersed phase to orientate itself in the direction of extrusion. When the further dispersed phase of rigid polymer is present, the dimensions and also the number of the lamellar structures typical of this phase are also substantially reduced.

Depending upon the machines available, those skilled in the art will be able to identify the temperature and shear conditions capable of achieving such reductions.

In general the most suitable extrusion systems are those fitted with laminating screws having a ratio of less than 1.6 and more preferably less than 1.4 between the maximum and minimum diameters of the screws.

As regards the hydrophobic polyesters forming the continuous phase, these are preferably of the diacids-diol type.

Said polyester may be either aliphatic or aliphatic-aromatic. Preferably, said hydrophobic polyesters are biodegradable polymers according to standard EN 13432.

The aliphatic polyesters of the diacids-diol type comprise aliphatic diacids and aliphatic diols, while the aliphatic-aromatic polyesters of the diacids-diol type have an aromatic part mainly comprising polyfunctional aromatic acids, the aliphatic part being constituted by aliphatic diacids and aliphatic diols.

The aliphatic aromatic polyesters of the diacids-diol type are preferably characterised by an aromatic acids content of between 30 and 90% in moles, preferably between 45 and 70% in moles with respect to the acid component.

Preferably the polyfunctional aromatic acids may advantageously be dicarboxylic aromatic compounds of the phthalic acid type and their esters, preferably terephthalic acid.

The polyfunctional aromatic acids may also be selected from heterocyclic dicarboxylic aromatic acids, among which 2,5-furandicarboxylic acid and its esters are preferred.

Aliphatic-aromatic polyesters of the diacids-diol type in which the aromatic diacid component comprises a mixture of dicarboxylic aromatic compounds of the phthalic acid type and heterocyclic dicarboxylic aromatic acids are particularly preferred.

The aliphatic diacids of the aliphatic-aromatic polyesters of the diacid-diol type are aliphatic dicarboxylic acids such as oxalic acid, malonic acid, succinic acid, glucaric acid, adipic acid, pimelic acid, suberic acid, azelaic acid, sebacic acid, undecandioic acid, dodecanoic acid and brassylic acid, their esters and their mixtures. Among these adipic acid and dicarboxylic acids from renewable sources are preferred, and among these dicarboxylic acids from renewable sources such as succinic acid, sebacic acid, azelaic acid, undecanedioic acid, dodecanedioic acid and brassylic acid and their mixtures are particularly preferred.

Examples of aliphatic diols in polyesters of the diacid-diol type are: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, neopentylglycol, 2-methyl-1,3-propanediol, dianhydrosorbitol, dianhydromannitol, dianhydroiditol, cyclohexanediol, cyclohexanemethanediol and their mixtures. Of these, 1,4-butanediol, 1,3-propanediol and 1,2-ethanediol and their mixtures are particularly preferred.

Among polyesters of the diacid-diol type, particularly preferred are aliphatic/aromatic copolyesters such as for example polybutylene terephthalate-co-sebacate, polybutylene terephthalate-co-azelate, polybutylene terephthalate-co-brassilate, polybutylene terephthalate-co-adipate, polybutylene terephthalate-co-succinate and polybutylene terephthalate-co-glutarate, and aliphatic polyesters such as for example polyalkylene succinates and particularly polybutylene succinate and its copolymers with adipic acid and lactic acid.

In a particularly preferred embodiment, the hydrophobic polyesters forming the continuous phase of the compositions according to the present invention are selected from polyesters showing an Elastic Modulus of less than 200 MPa and an Elongation at break of more than 500% (measured on a 20-30 microns film at 23° C., 50% of RH and Vo=50 mm/min according to standard ASTM D882), such as for example aromatic aliphatic polyesters of diacids/diols of the type described in patent applications EP 559785 (Eastman), EP 792309 (BASF) and WO 2006/097353 (Novamont) or aliphatic polyesters of diacids/diols of the type described in patent EP 1 117 738, the disclosure of said patent applications being intended as incorporated in the present description. Compositions comprising more than one of the above aliphatic-aromatic and aliphatic polyesters are also particularly preferred.

As far as the at least one dispersed phase comprising at least one polymer of vegetable origin is concerned, the latter is advantageously selected from starch, cellulose, lignin, polysaccharides such as pullulans, alginates, chitin, chitosanes, natural rubbers, rosinic acid, dextrin, their mixtures and their derivatives such as for example esters or ethers. The cellulose and the starch may also be modified and in this respect mention may be made for example of esters of cellulose or starch having a degree of substitution between 0.2 and 2.5. It is also possible to use thermoplastic lignins. Among the polymers of vegetable origin, particular preference is given to starch.

With the term starch are here meant all types of starch, i.e.: flour, natural starch, chemically and/or physically modified starch, hydrolysed starch, destructured starch, gelatinised starch, plasticised starch, thermoplastic starch and mixtures thereof.

Particularly preferred according to the invention are starches such as potato, maize, tapioca, and pea starch, etc.

Starches which are capable of being easily destructured and which have high initial molecular weights, such as for example potato starch, have proved to be particularly advantageous.

In the case of destructured starch reference is made here to the teachings included in Patents EP-0 118 240 and EP-0 327 505, in which starch which has been processed in such a way as to substantially not present the so-called "Maltese crosses" under the optical microscope under polarised light and the so-called "ghosts" under the optical microscope under phase contrast is meant.

Advantageously, more than one polymer of vegetable origin may be used in the polyphase biodegradable compositions according to this invention. Mixtures containing starch and at least one other polymer of vegetable origin are particularly preferred.

Finally, as regards the further dispersed phase of a rigid polymer it is possible to use polyhydroxyalkanoates such as for example polylactic acid and polyglycolic acid. Polymers or copolymers of polylactic acid containing at least 75% of L-lactic or D-lactic acids or combinations thereof, having a molecular weight $M_W$ of more than 70,000 and a modulus of more than 1,500 MPa are particularly preferred. These polymers may also be plasticised.

In the polyphase biodegradable compositions according to this invention the plasticiser comprises at least 75% and preferably at least 90% by weight, with respect to the total weight of said plasticizer, of a mixture of diglycerol, triglycerol and tetraglycerol.

Preferably, said plasticizer show a flash point, i.e. the lowest temperature at which it can vaporize to form an ignitable mixture in air, >220° C., a fire point, i.e. the temperature at which the vapor continues to burn after being ignited, >250° C. and a boiling point of more than 200° C. at 1.3 mbar.

Advantageously the mixture mentioned above comprises more than 50% by weight and preferably more than 80% by weight of diglycerol with respect to the sum of di-, tri- and tetraglycerol.

For the purposes of this invention the name diglycerol is here understood to mean all those compounds deriving from the condensation of two glycerol molecules, such as for example alpha-alpha diglycerol, alpha-beta diglycerol, beta-beta glycerol and the various cyclic isomers and mixtures thereof.

As far as diglycerol is concerned, it preferably comprises at least 70% by weight of alpha-alpha diglycerol.

A surprising characteristic of this plasticiser in comparison with glycerine is that the fluidity of the composition and its processability does not change substantially even for significant changes in its concentration with respect to the polymer of vegetable origin, and substantial isotropy of the films produced is always guaranteed in terms of form of the dispersed phase. In addition to this, there are no problems with fumes in the film-making environments and there are no frequent shutdowns made necessary for cleaning the machines during the industrial production of film. The quantity of plasticiser is between 2% and 70% by weight with respect to the weight of the polymer of vegetable origin, preferably between 5% and 50.% by weight, and more preferably between 7 and 45.% by weight with respect to the polymer of vegetable origin.

Plasticisers which can be used in the compositions according to the invention in addition to the mixtures described above are for example those described in WO 92/14782. The complement to 100 of the mixtures described above may be any other plasticiser which enables the total plasticiser to preferably have a boiling point of more than 200° C. at 1.3 mbar, a flash point >220° C. and a fire point of >250° C. The glycerine content must be as low as possible and in any event less than 10% of the total mixture of high-boiling-point plasticisers. Various additives such as antioxidants, UV stabilisers, thermal and hydrolysis stabilisers, flame retardants, slow release agents, inorganic and organic fillers, such as for example natural fibres, antistatic agents, humectants, dyes, lubricants or agents enhancing compatibility between the various phases may of course also be incorporated into these biodegradable compositions.

The composition according to the present invention are biodegradable according to the standard EN 13432.

Chain extenders such as peroxides, mono-, di- and poly-epoxides, polyepoxide acrylates and their copolymers with styrene, aliphatic, aromatic or aliphatic-aromatic carbodiimide oligomers and polymers, isocyanates, isocyanurates and combinations thereof, anhydrides and polyanhydrides enhancing compatibility between the polymer of vegetable origin and the other polymers of the composition may also be added.

The polyphase biodegradable compositions according to this invention are particularly suitable for the production of films, bags and envelopes in general, when extruded and thermoformed, laminated with card, aluminium, plastics and bioplastics, or multiply pierced. In particular the films produced with polyphase biodegradable compositions according to this invention have proved to be particularly suitable for the production of carrier bags and wrappings capable of supporting large weights.

This invention is now illustrated with reference to some non-restrictive examples thereof.

EXAMPLES

TABLE 1

Compositions with "Mixture 1" plasticiser

| Example | Starch | Ecoflex ® | Ecopla ® | Mixture 1 | Lubricant |
|---------|--------|-----------|----------|-----------|-----------|
| 1-1 | 15.5 | 67 | 12 | 1.55 | 0.3 |
| 1-2 | 15.5 | 67 | 12 | 2.33 | 0.3 |

TABLE 1-continued

Compositions with "Mixture 1" plasticiser

| Example | Starch | Ecoflex ® | Ecopla ® | Mixture 1 | Lubricant |
|---|---|---|---|---|---|
| 1-3 | 15.5 | 67 | 12 | 3.1 | 0.3 |
| 1-4 | 15.5 | 67 | 12 | 4.65 | 0.3 |
| 1-5 | 15.5 | 67 | 12 | 6.2 | 0.3 |

TABLE 2

Compositions with "Mixture 2" plasticiser

| Example | Starch | Ecoflex ® | Ecopla ® | Mixture 2 | Lubricant |
|---|---|---|---|---|---|
| 2-1 | 15.5 | 67 | 12 | 3.1 | 0.3 |
| 2-2 | 15.5 | 67 | 12 | 4.65 | 0.3 |
| 2-3 | 15.5 | 67 | 12 | 6.2 | 0.3 |

TABLE 3

Compositions with "Reference" plasticiser

| Example | Starch | Ecoflex ® | Ecopla ® | Reference | Lubricant |
|---|---|---|---|---|---|
| 3 | 15.5 | 67 | 12 | 3.1 | 0.3 |

Where not explicitly indicated figures are expressed in parts.

Mixture 1: 80% of diglycerol (84% alpha-alpha glycerol, 14% alpha-beta glycerol, 2% beta-beta glycerol), 10% triglycerol, 3% tetraglycerol and 7% glycerol. Boiling point 205° C. at 1.3 mbar.

Mixture 2: 47% triglycerol, 27% diglycerol, 15% tetraglycerol, 5% pentaglycerol, 2% hexaglycerol, 1% heptaglycerol, glycerol 1%.

Reference: 100% glycerol.

Starch: native corn starch (containing 11% by weight of water)

Ecoflex®: polybutyleneadipate-co-terephthalate produced by BASF.

Ecopla®: polylactic acid produced by Cargill.

The compositions shown in Tables 1-3 were fed to a co-rotating extruder with L/D=36 and a diameter of 60 mm with 9 heating zones.

The extrusion parameters were as follows:

RPM: 140

Throughput: 40 kg/hour

Thermal profile 60-140-175-180×4-155×2° C.

Screw diameter ratio (max diam./min diam.) 1.31-1.35

Final water content of the granulate 0.8%.

The compositions in Table 1 were converted into film on a Ghioldi 40 mm machine, die gap=1 mm, throughput 20 kg/h, to obtain films having a thickness of 20 and 40 μm.

The 20 μm films were then tested mechanically according to standard ASTM D882 (tensile test at 23° C. and 55% relative humidity and Vo=50 mm/min) and ASTM D1922 (tearing at 23° C. and 55% relative humidity).

The results are shown in Tables 4 and 5 below.

TABLE 4

Mechanical properties according to standard ASTM D882 (tensile strength at 23° C. and 55% relative humidity and Vo = 50 mm/min)

| Sample | | $\sigma_b$ (MPa) | $\epsilon_b$ (%) | E (MPa) | $En_b$ (kJ/m$^2$) |
|---|---|---|---|---|---|
| 1-2 | MD | 29 | 365 | 300 | 3805 |
|  | TD | 24 | 687 | 226 | 4927 |
| 1-3 | MD | 27 | 357 | 317 | 3335 |
|  | TD | 26 | 707 | 203 | 5341 |
| 1-5 | MD | 25 | 347 | 259 | 3044 |
|  | TD | 24 | 693 | 125 | 4371 |
| 3 | MD | 29 | 254 | 400 | 2494 |
|  | TD | 27 | 738 | 248 | 5672 |

TABLE 5

Mechanical properties according to standard ASTM D1922 (tearing at 23° C. and 55% relative humidity).

| Sample | | Tear strength (N/mm) |
|---|---|---|
| 1-1 | MD | 163 |
|  | TD | 148 |
| 1-2 | MD | 195 |
|  | TD | 155 |
| 1-3 | MD | 207 |
|  | TD | 91 |
| 1-4 | MD | 162 |
|  | TD | 80 |
| 1-5 | MD | 155 |
|  | TD | 72 |
| 2-1 | MD | 182 |
|  | TD | 94 |
| 2-2 | MD | 162 |
|  | TD | 81 |
| 2-3 | MD | 135 |
|  | TD | 75 |
| 3 | MD | 164* |
|  | TD | 50** |

*tearing deviates from the imposed direction by 90° C.; **not very tough, tending towards brittle The films obtained from compositions according to Examples 2-1 and 3 were then submitted to a migration test in water.

Each migration test was carried out into a 250 ml cylinder provided with a ground glass top and containing as simulant 100 ml of water HPLC grade (Water (HPLC-gradient) PAI by Panreac Quimica S.A.U.).

Before starting the migration test, the cylinder containing the simulant was placed in a thermostatically controlled chamber set at 20° C. and left therein until the simulant reached said temperature.

From each film a sample having dimension 70×80 mm was obtained. Each sample was weighted, then completely immersed in the simulant and maintained in the thermostatically controlled chamber set at 20° C. for 24 hours.

After 24 hours the sample was removed from the simulant and rinsed with water.

25 ml of the simulant was then concentrated to a final volume of 5 ml by heating at 50° C. under a small air flow and the content of plasticizers in the simulant was determined by liquid chromatography using an HPLC Accela 600 Thermo provided with a chromatographic column Hamilton HC-75 and a refraction index detector. The eluent consisted of water with a flow of 0.5 ml/min. the system was thermostat-controlled at 85° C.

The results are shown in Tables 6 below.

TABLE

Migration test in water (20° C., 24 hours).

| Example | plasticizer | % plasticizer migrated in water * |
|---------|-------------|-----------------------------------|
| 2-1     | Mixture 2   | 21                                |
| 3       | Reference   | 100                               |

* calculated as weight percentage with respect to the total weight of plasticizers in the samples

The invention claimed is:

1. A film produced from a polyphase biodegradable composition having a good resistance to aging comprising:
   (a) a continuous phase comprising at least one hydrophobic polyester,
   (b) at least one dispersed phase comprising at least one polymer of vegetable origin,
in which the hydrophobic polyester of the continuous phase is an aliphatic aromatic polyester of the diacid-diol type with a content of aromatic units of from 45 to 70 mol % and is incompatible with the polymer of vegetable origin, said polymer of vegetable origin being starch, said composition comprising 2 to 70% by weight, with respect to the weight of the polymer of vegetable origin, of a plasticizer comprising at least 75 wt %, with respect to the total weight of said plasticizer, of a mixture of diglycerol, triglycerol and tetraglycerol, and less than 10% by weight of glycerin; wherein:
   the composition comprises from 45 to 98% by weight of component (a) and from 2 to 55% by weight of component (b) with respect to the sum of components (a) and (b);
   the aliphatic-aromatic polyester comprises as the aliphatic acid an acid selected from the group consisting of adipic acid, succinic acid, azelaic acid, sebacic acid, undecandioic acid, dodecandioic acid and brassylic acid;
   the aliphatic-aromatic acid comprises terephthalic acid as the aromatic acid;
   the composition comprises from 1 to 40% by weight of a further dispersed phase comprising a polyhydroxyalkanoate which is rigid in comparison with the hydrophobic polyester of the continuous phase, with a Young's modulus of more than at least 300%; and
   wherein the polymer composition exhibits an Elmendorf tear strength of more than 60 N/mm in the transverse direction upon filming.

2. The polyphase biodegradable composition according to claim 1, in which the hydrophobic polyester is biodegradable according to standard EN 13432.

3. The polyphase biodegradable composition according to claim 1 in which the starch is flour, natural starch, chemically and/or physically modified starch, hydrolysed starch, destructured starch, gelatinised starch, plasticised starch, thermoplastic starch or mixtures thereof.

4. The polyphase biodegradable composition according to claim 1 in which the polyhydroxyalkanoate is a polymer or copolymer of polylactic acid containing at least 75% of L-lactic or D-lactic acid or combinations thereof having a molecular weight $M_w$ of more than 70,000 and a Young's modulus of more than 1,500 MPa.

5. The polyphase biodegradable composition according to claim 1 in which the plasticiser comprises at least 90% of a mixture of diglycerol, triglycerol and tetraglycerol.

6. The polyphase biodegradable composition according to claim 5 in which said mixture contains more than 50% by weight of diglycerol with respect to the sum of the di-, tri- and tetraglycerol.

7. The polyphase biodegradable composition according to claim 1 in which the diglycerol comprises at least 70% by weight of alpha-alpha diglycerol.

8. Bags and envelopes in general produced using the film according to claim 1, being selected from the group consisting of extruded and thermoformed bags and envelopes, laminated with board, aluminium, plastics or bioplastics, and multiply perforated bags and envelopes.

* * * * *